(12) United States Patent
Bullock

(10) Patent No.: US 7,905,606 B2
(45) Date of Patent: Mar. 15, 2011

(54) SYSTEM AND METHOD FOR AUTOMATICALLY MODIFYING AN IMAGE PRIOR TO PROJECTION

(75) Inventor: Roger Lee Bullock, Webster, NY (US)

(73) Assignee: Xerox Corporation, Stamford, CT (US)

( * ) Notice: Subject to any disclaimer, the term of this patent is extended or adjusted under 35 U.S.C. 154(b) by 675 days.

(21) Appl. No.: 11/485,127

(22) Filed: Jul. 11, 2006

(65) Prior Publication Data

US 2008/0013057 A1 Jan. 17, 2008

(51) Int. Cl.
*G03B 21/14* (2006.01)

(52) U.S. Cl. ............................... 353/69; 353/70
(58) Field of Classification Search .............. 353/69, 353/70; 382/108
See application file for complete search history.

(56) References Cited

U.S. PATENT DOCUMENTS

| | | | |
|---|---|---|---|
| 5,758,941 A | 6/1998 | Stahl | |
| 6,520,646 B2 | 2/2003 | Rodriguez, Jr. et al. | |
| 6,568,814 B2 | 5/2003 | Rodriguez, Jr. et al. | |
| 6,652,104 B2 | 11/2003 | Nishida et al. | |
| 6,750,442 B2 | 6/2004 | Bala et al. | |
| 6,771,272 B2 | 8/2004 | Deering | |
| 6,817,721 B1 | 11/2004 | Ulichney et al. | |
| 6,824,276 B2 | 11/2004 | Kimura | |
| 6,846,081 B2 | 1/2005 | Mochizuki et al. | |
| 6,924,816 B2 | 8/2005 | Deering | |
| 6,940,529 B2 | 9/2005 | Deering | |
| 6,953,250 B2 | 10/2005 | Yasumi et al. | |
| 6,979,087 B2 | 12/2005 | Honig et al. | |
| 7,001,023 B2 | 2/2006 | Lee et al. | |
| 7,104,652 B2 * | 9/2006 | Kojima | 353/33 |
| 7,154,395 B2 * | 12/2006 | Raskar et al. | 340/572.4 |
| 7,513,628 B2 * | 4/2009 | Niesten | 353/70 |
| 2003/0042401 A1 * | 3/2003 | Gartner et al. | 250/208.1 |
| 2003/0151810 A1 * | 8/2003 | Haisch et al. | 359/464 |
| 2004/0044564 A1 * | 3/2004 | Dietz et al. | 705/10 |
| 2004/0070616 A1 * | 4/2004 | Hildebrandt et al. | 345/764 |
| 2004/0150835 A1 * | 8/2004 | Frick et al. | 356/601 |
| 2004/0233216 A1 * | 11/2004 | Rekimoto et al. | 345/592 |
| 2005/0001991 A1 * | 1/2005 | Ulichney et al. | 353/69 |
| 2005/0013477 A1 * | 1/2005 | Ratti et al. | 382/154 |
| 2005/0185711 A1 * | 8/2005 | Pfister et al. | 375/240.01 |
| 2006/0268153 A1 * | 11/2006 | Rice et al. | 348/370 |
| 2007/0099700 A1 * | 5/2007 | Solomon et al. | 463/34 |
| 2007/0188623 A1 * | 8/2007 | Yamashita et al. | 348/222.1 |
| 2007/0236671 A1 * | 10/2007 | Bitetto | 353/122 |
| 2007/0242233 A1 * | 10/2007 | Sokeila et al. | 353/69 |
| 2007/0273845 A1 * | 11/2007 | Birmingham | 353/101 |
| 2008/0107360 A1 * | 5/2008 | Yamashita et al. | 382/313 |

OTHER PUBLICATIONS

Li et al., "Automatic Keystone Correction for Smart Projectors with Embedded Camera", 2004 Intnl. Conf. on Image Proc. (ICIP), Sharp Labs. of Amer., IEEE, pp. 2829-2832 (2004).

* cited by examiner

*Primary Examiner* — Thanh X Luu
*Assistant Examiner* — Danell L Owens
(74) *Attorney, Agent, or Firm* — Carter, DeLuca, Farrell & Schmidt, LLP

(57) ABSTRACT

A system and method for automatically modifying an image prior to projection. The system includes an image forming element configured to project an image to a projection surface having at least one property and a detection module coupled to the image forming element, the detection module capable of detecting at least one property with respect to the surface. The system further includes at least one processor configured to modify an outgoing image in response to the at least one property of the surface, such as color, texture and surface curvature.

20 Claims, 3 Drawing Sheets

FIG. 1A
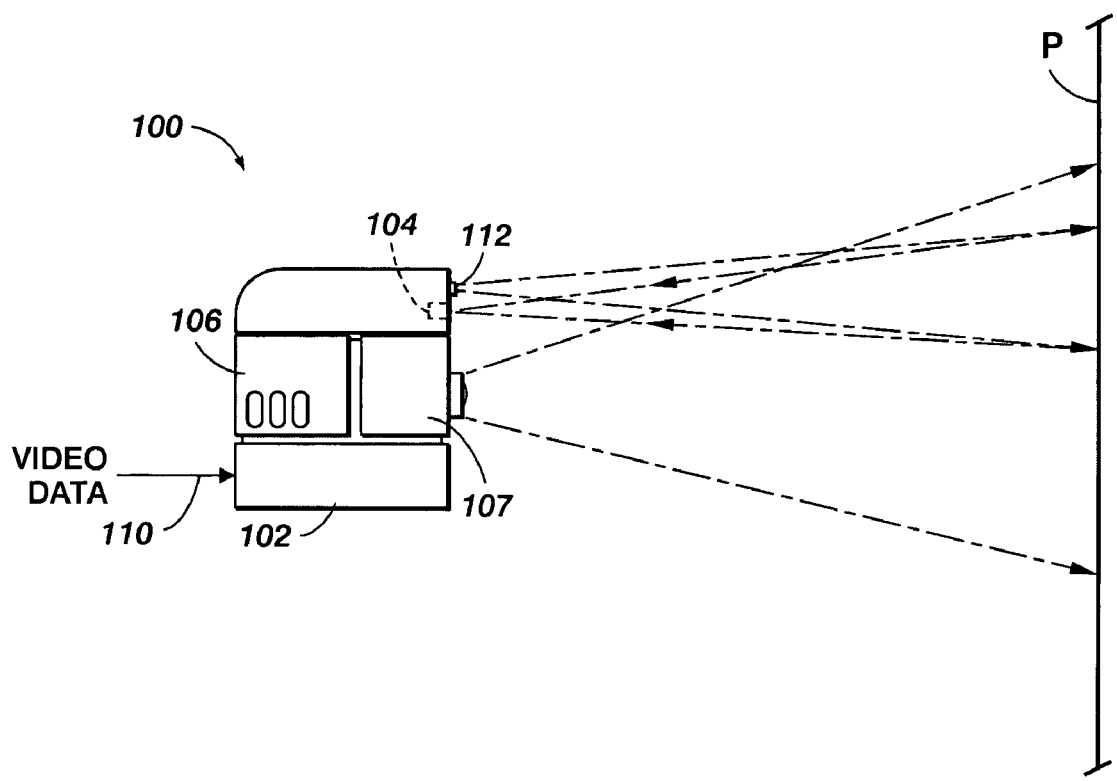
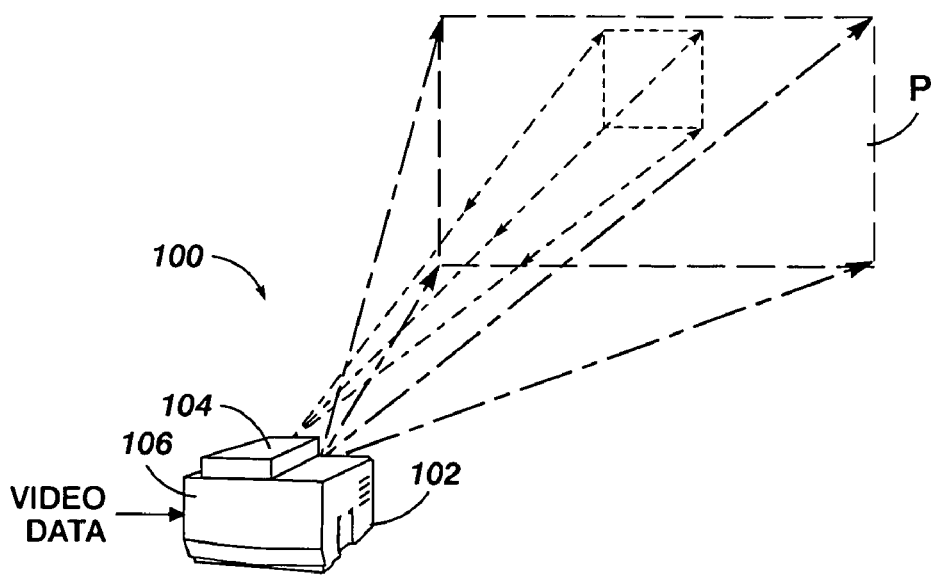
FIG. 1B

SYSTEM AND METHOD FOR AUTOMATICALLY MODIFYING AN IMAGE PRIOR TO PROJECTION

BACKGROUND

The present disclosure relates to visual media, more specifically, to a system and method for automatically modifying an image prior to projection.

Video projectors are widely used for conference room presentations, classroom training, and home theatre applications. A video projector takes a video signal and projects the corresponding image on a projection screen or surface using a lens system. Video projectors use a very bright light to project the image, and most projectors can correct curves, blurriness and other inconsistencies through manual settings.

There are two basic types of projectors, transmissive and reflective. In both types of projectors, a lens collects the image from the image-forming element, magnifies the image and focuses it onto a screen. Transmissive projectors utilize either cathode-ray tubes (CRTs) or liquid crystal displays (LCDs) as the image forming element. Reflective projectors include microelectromechanical systems (MEMS) and liquid crystal on silicon (LCOS).

Typically, images are projected onto a screen, wall or other surface. However, many of these surfaces may have varying degrees of color and texture variations which can cause unacceptable or non-optimal color shifts. For example, walls may be painted different colors and may have non-uniform surfaces and textures that adversely affect the image's appearance to the viewer.

It has been relatively difficult to correct distortion in an image displayed on a wall or projection screen. This is because correcting distortion in a displayed image requires knowledge of the color of the projection surface as well as any irregularities that may exist on the surface. Manual color correction and intensity adjustments can be time consuming and unable to provide optimal performance. Therefore, what is needed, is a system and method for automatically modifying an image prior to projection, which takes into account these factors.

SUMMARY

According to the present disclosure a system for automatically modifying an image prior to projection is provided. The system includes an image forming element configured to project an image to a projection surface having at least one property. A detection module capable of detecting at least one property of the surface is coupled to the image forming element. The system further includes at least one processor configured to modify an outgoing image in response to the at least one property of the surface. The at least one property can include color, texture and curvature of the projection surface.

The present disclosure provides a method for modifying an image prior to projection. The method includes the steps of emitting light rays onto a projection surface and detecting reflected light rays from the projected surface. The method also includes the steps of determining at least one property of the projection surface and creating a profile, and creating an overlay by comparing the profile to a standard profile. The method further includes the steps of utilizing the overlay to modify an image and projecting a modified image to the projection surface. The at least one property includes color, texture and curvature of the projection surface.

In one embodiment of the present disclosure a video projector including a detection module capable of emitting light rays and detecting at least one property of a projection surface is provided. The projector includes a compensation module having at least one processor configured to modify an outgoing image in response to the at least one property of the projection surface and a video receiving unit connected to the compensation module configured to receive the modified outgoing image. The projector further includes an image forming element, such as a liquid crystal display, configured to allow the modified outgoing image to pass therethrough. The at least one property can include color, texture and curvature of the projection surface.

BRIEF DESCRIPTION OF THE DRAWINGS

Various embodiments of the present disclosure will be described herein below with reference to the figures wherein:

FIG. 1A is a side view of the system of the present disclosure;

FIG. 1B is a perspective view of the system shown in FIG. 1;

DETAILED DESCRIPTION

Figure 2:
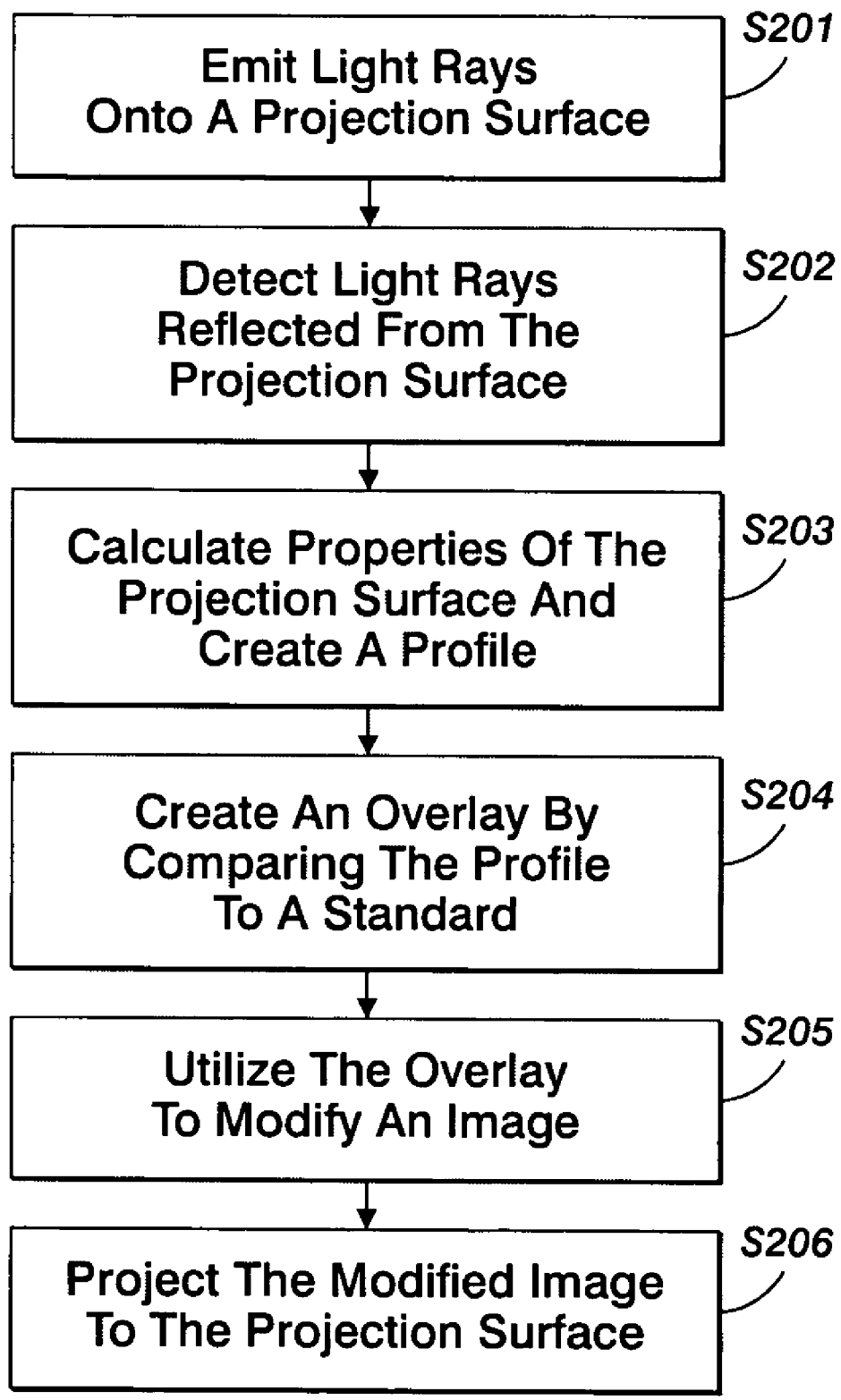
FIG. 2 is a flow chart indicating the steps of the method of the present disclosure.

Embodiments of the present disclosure will be described herein below with reference to the accompanying drawings. In the following description, well-known functions or constructions are not described in detail to avoid obscuring the present disclosure in unnecessary detail.

FIGS. 1A and 1B show side and perspective views of system 100. System 100 includes image projector 102, detection module 104, processor 106 and image forming element 107. System 100 is configured to detect the properties of a projection surface "P" and to compensate the projected image automatically.

Image projector 102 includes detection module 104 and processor 106. Detection module 104 projects a series of colors and intensities towards projection surface "P". These colors are then reflected off of projection surface "P" back towards detection module 104. Module 104 detects the reflected light to determine the color and intensity shift. The detection module 104 can be a standard CCD array as used in cameras or specialty linear array, such as described in U.S. Pat. No. 6,750,442.

Detection module 104 projects colors or RIB/G wavelength components onto segments/sections of the projection surface "P" in a series (the wavelength components optimally have a slight, overlap along the projection surface "P") and detects the intensity and reflected color for each section of the projection surface "P". This process is repeated for each projected color or wavelength component and for at least two brightness levels. Spectral and reflectivity levels as determined by detection module 104 for each reflected color aid module 104 in determining surface roughness (i.e., surface texture) and color/hue of the projection surface "P".

Surface roughness of the projection surface "P" can also be determined by the user using a contact sensor to measure surface roughness with the information feeding back wirelessly to processor 106. The contact sensor can be a sensor used for color process controls, such as a spectrophotometer sensor which detects color absorption or direct reflection and scatter reflection characteristics of a surface.

Additional methodology for determining properties of the projection surface "P" are described below with reference to an emitter/detector unit 112 (EDU).

The detection module 104 can include a series of R/B/G LEDs or Lasers for projecting the R/B/G wavelength components onto the projection surface "P". The time from projection (or emission) to detection can be used by the processor 106 to determine variations of distance between the detection module 104 and the projection surface "P". This distance information can be used in focusing the projected pixels and achieving optimal focal clarity of the pixels.

The detected signals which are used to determine surface roughness and color of the projection surface "P" can be stored in a memory of the processor 106. A profile of the projection surface "P" is created and saved by the processor 106. The profile indicates the color and surface reflectivity "smoothness" of the projection surface "P". The surface reflectivity "smoothness" is quantified by the processor 106 by comparing it to a nominal standard, such as professional grade projection screen. The nominal standard also includes a stored profile, referred to as a standard profile.

For example, the nominal standard can be "10" and each projection surface is given a grade less than, equal to, or greater than ten. If the grade is about or equal to ten, the projection surface resembles that of a professional grade projection screen. If the grade is less than ten, the projection surface is less smooth than the professional grade projection screen. If the grade is greater than ten, the projection surface is smoother than the professional grade projection screen.

These new factors or surface properties, color and smoothness of the projection surface "P", as determined by system 100 are then used by system 100 to adjust the incoming digital bit stream, thereby compensating the projected image automatically at least with respect to the color and surface roughness of the projection surface "P". This achieves an optimal display of the projected image on the projection surface "P".

The calibration information used to adjust the incoming digital bit stream can provide for color adjustment of one or more pixels of the projected image, a change in contrast of the projected image, a change in the light intensity of the projected image, variations in pixel size, creation of larger pixels by combining two or more pixels, etc. The calibration information can be transmitted, for example, via a bus or router, to an embedded color correction routine, which compensates for the color shift due to a non-optimal background. A color correction look-up table, or series of algorithms can also be used to modify image data on a pixel or a color cell basis in accordance with the calibration information.

In image processing, lookup tables are often called LUTs, and they link index numbers to output values. One common LUT, called the colormap, is used to determine the colors and intensity values with which a particular image will be displayed. The idea behind the colormap is that instead of storing a definite color for each pixel in an image, each pixel's value is instead treated as an index number into the colormap (e.g., 24-bit RGB (Red-Green-Blue) format). When the image is to be displayed or otherwise processed, the colormap is used to look up the actual colors corresponding to each index number. Typically, the output values stored in the LUT would be RGB color values.

Image projector 102 may utilize a number of different image forming elements 107, some of which may include, but are not limited to, cathode ray tubes (CRTs), liquid crystal displays (LCDs), digital light processing (DLPs), grating light valves (GLVs) or liquid crystal on silicon (LCOS). Image projector 102 receives video signal through video input module 110, adjusts the image using the data obtained from detection module 104 and projects the corresponding image on projection surface "P" using a lens (e.g., fresnel) or system of lenses.

Image projector 102 may emit light using a variety of different mechanisms. Some suitable light emitting mechanisms could include LEDs or metal-halide lamps. It is envisioned that a number of metal-halide lamps could be used, such as, UHP, HTI or HID lamps. These lamps often require smaller and less-expensive power sources than other types of lamps and have an efficient watts-to-lumens ratio that provides high brightness, longer lamp life and lower cost of projector ownership. However, metal-halide lamps may cast uneven light patterns, creating deficiencies in red tones and overbearing yellows and greens. It is envisioned that filters, prism coatings and other optical components may be used with image projector 102 to better balance the light.

Detection module 104 is electrically coupled to image projector 102. Module 104 includes the emitter/detector unit 112 (EDU) that is configured to detect/determine the distance, texture, color, etc. of the projection surface "P". EDU 112 is configured to emit and detect light rays of varying intensities and wavelengths. EDU 112 optically scans the projection surface "P" and calculates information regarding the properties of projection surface "P". These properties may include the distance between projection surface "P" and image projector 102, information regarding the color of projection surface "P" and information pertaining to the texture/roughness of projection surface "P" (e.g., the non-uniformity, contours or irregularities of the surface). This information is transferred from detection module 104 to processor 106. The properties relating to projection surface "P" could be obtained using CCDs, digital cameras or optical scanning techniques.

It is envisioned that detection module 104 may be a remote detector that is placed on projection surface "P", which then wirelessly feeds information back to image projector 102 to interpret correct ion factors. The remote detector can include a translucent patch with spectral sensing members for measuring the projected light and detecting the reflective response from the projection surface onto individual R/G/B detectors similar to R/G/B detectors used in printing color process controls. Moreover, detection module 104 may include a series of mirrors or reflective panels that may be placed upon detection surface "P". These mirrors communicate optically with EDU 112 of detection module 104 to provide distance or color information.

Detection module 104 and specifically EDU 112 may contain spectral sensors configured to scan a projection surface "P" and determine its corresponding color. These sensors are configured to make color measurements of an image that can be related to visual color representations such as CIELAB. The color measurements are sent to processor 106 and used to automatically identify the color and type of surface being scanned. A more detailed discussion of automated color correction is provided in U.S. Pat. No. 6,750,442, the entire contents of which, is incorporated by reference herein.

The sensors may include an electro-optical element for registering or sensing the spectral reflection from a color image and generating a colorimetric measurement therefrom. The electro-optical element may have an aperture through which light may travel. Spectral reflection measurement devices measure the reflectance of an illuminated object of interest over many light wavelengths, to substantially cover the visible color spectrum or wavelength range. From these spectral measurements, it is possible to derive colorimetric values such as CIELAB, which represent visual perception of color under specific viewing conditions. Some possible distance calculating sensors could include, but are not limited to, ultrasonic sensors, photoelectronic sensors and inductive sensors.

Processor 106 is configured to modify an outgoing image in response to the information obtained from detection module 104 regarding the properties of projection surface "P". Processor 106 includes a memory component as well as embedded color and intensity correction routines that compensate for the color shift due to a non-white background. The created profile obtained from detection module 104 is compared to the standard profile and a compensation overlay is created. This overlay is then stored within memory for subsequent reuse at that location. Any incoming video data or LCD/DLP individual pixels are modified using this compensation overlay. This provides new intensity and color cells that are ready for projection.

The system of the present disclosure could utilize a number of different image forming elements. For example, a liquid crystal display (LCD) could be used as part of the image forming element 107 of image projector 102. LCD projectors usually contain three separate LCD glass panels, one each for the red, green, and blue components of the incoming video signal. As light passes through the LCD panels, individual pixels can be opened to allow light to pass or closed to block the light. This activity modulates the light and produces the image that is projected onto the screen.

Alternative embodiments of the system of the present disclosure could utilize digital light processing (DLP) as part of image forming element 107 of image projector 102. DLP utilizes extremely small mirrors positioned on a semiconductor, often referred to as a digital micromirror device (DMD). The rapid repositioning of the mirrors (essentially switching between 'on' and 'off') allows the DMD to vary the intensity of the light being reflected out through the lens, creating shades of grey in addition to white (mirror in 'on' position) and black (mirror in 'off' position). A rotating color wheel having red, green and blue produces the colors of the projected image. There are two primary methods by which DLP projection systems create a color image, those utilized by single-chip DLP projectors and those used by three-chip projectors. It is envisioned that system 100 could utilize either method. Alternative embodiments, such as LCOS, which utilize liquid crystals instead of small mirrors, are also envisioned.

Projection surface "P" may be a projection screen, wall or any other surface capable of receiving a projected image. Each of these surfaces will have varying degrees of color and texture variations that must be taken into account.

In one embodiment of the present disclosure a method 200 for automatically modifying an image prior to projection is disclosed. Light rays are emitted onto projection surface "P" (STEP 201). These light rays reflect off of projection surface "P" and are detected by detection module 204 (STEP 202). Processor 106 calculates the properties of projected surface "P" to create a profile (STEP 203). An overlay is created by comparing the created profile to a standard profile (STEP 204). The overlay is then used to modify an image (STEP 205). The newly modified image is sent to projection surface "P" (STEP 206).

Figure 3:
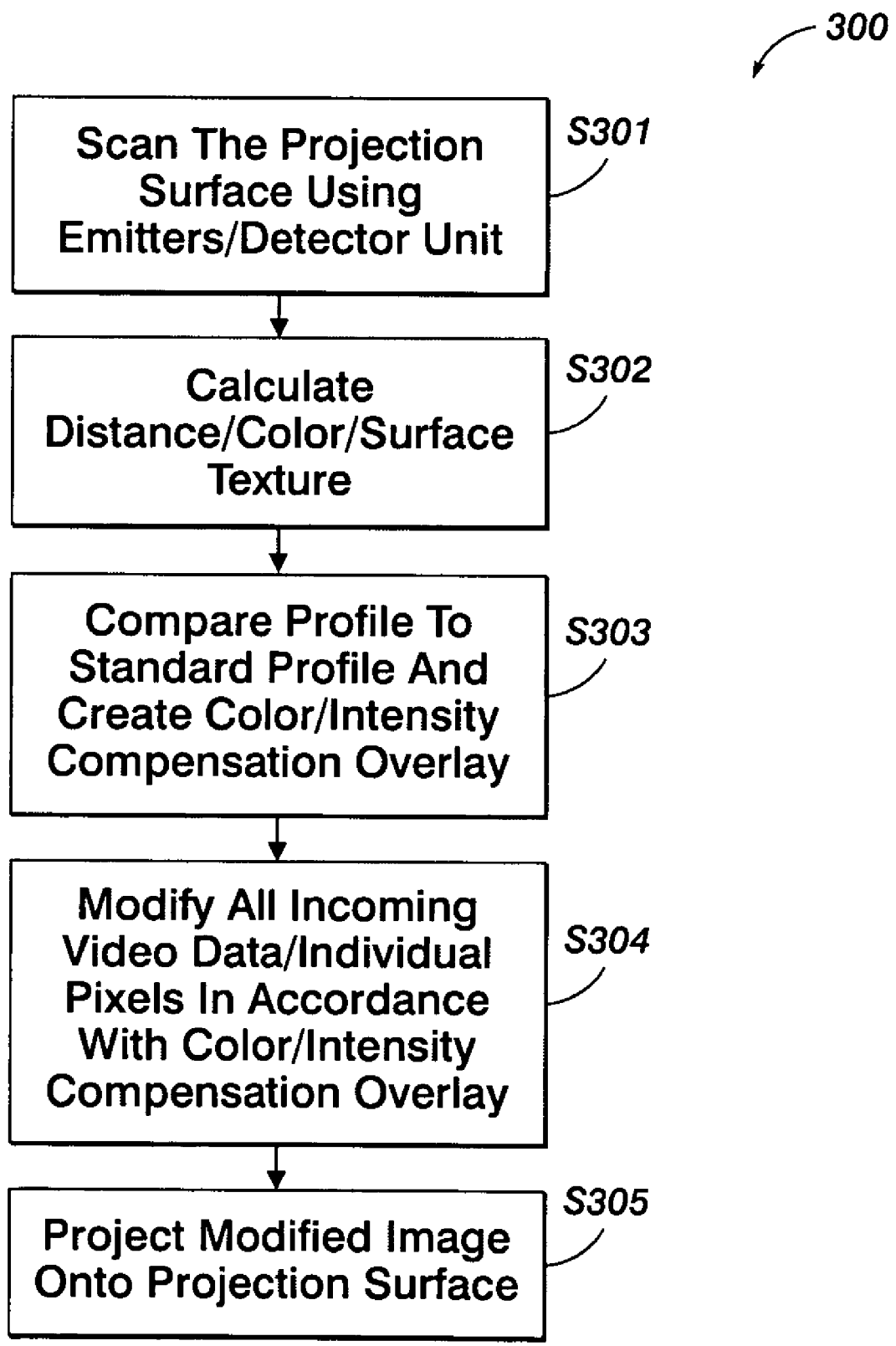
FIG. 3 is a flow chart depicting the method of the present disclosure.

FIG. 3 shows an alternate embodiment of a method 300 in accordance with the present disclosure. EDU 112 scans projection surface "P" (STEP 301). The parameters of projections surface "P" are then calculated/determined and the profile is created. The created profile, besides including information relating to the color and roughness of the projection surface "P", can also include information relating to the distance from the detection module 104 to the projection surface "P", pixel intensity/clarity and color shift information detected from a color/intensity sweep, and surface curvature information. Surface curvature can be determined by sweeping the projection surface "P" using a laser or by other surface curvature techniques known in the art. Surface texture can be extrapolated from scatter levels detected from the sweep, such as used in "ETAC Sensors" or input from one or more contact sensors. (STEP 302). The created profile is then compared to the standard profile and a color/intensity compensation overlay is created. (STEP 303). The image is stored within memory and may be reused (STEP 304). With the overlay now stored, all of the incoming video data (or the LCD, DLP individual pixels) are modified for the new intensity and the color cells are compensated prior to projection to account for one or more of the determined surface properties, i.e., color, texture, surface curvature, etc. (STEP 305). The modified image is then projected onto projection surface "P". (STEP 306).

It is provided that a user can skew the projected image by modifying the stored compensation overlay to account for user specific image preferences. For example, the stored overlay can be modified using a computing interface such as a GUI to adjust the image for viewing by a colorblind user (e.g., transform the image to grayscale prior to projection), to adjust the image for viewing in a low ambient lighting environment (e.g., increase pixel intensity), and/or to adjust the image for viewing by a user having poor eyesight (e.g., increase pixel size). The modified overlay can be stored as a user preference overlay indicative of image adjustments preferred by the user.

It is further provided that an RFID tag can be provided in proximity to the projection surface "P" having a memory storing at least one of the compensation overlay and the at least one property associated with the projection surface "P" (i.e., color, surface texture, and surface curvature). The system 100 can include an RFID reader for reading the RFID tag and accessing at least one of the compensation overlay and the at least one property for utilizing this information in modifying the image prior to projection onto the projection surface "P".

It is envisioned that the system and method of the present disclosure may be used in conjunction with keystone, anamorphic or pincushion correction techniques. One description of keystone correction techniques can be found in the 2004 International Conference on Image Processing (ICIP), Vol. 4, October 2004, Page (s):2829-2832, the entire contents of which is incorporated by reference herein.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A system for automatically modifying an image prior to projection comprising:
   an image forming element configured to project an image to a projection surface having at least one property;
   a detection module coupled to the image forming element, the detection module capable of determining at least one property with respect to the projection surface, wherein the detection module further comprising:
   a light source is projecting a series of colors and intensities towards the projection surface and of detecting the reflected colors and intensities from the projection surface to determine the color and intensity shift, wherein the series of colors have a slight, overlap along the projection surface; and at least one processor configured to modify an outgoing image in response to the at least one property of the surface, where the at least one property of the surface includes texture.

2. The system according to claim 1, wherein the at least one property is selected from a group further comprising: color and distance from the detection module to the surface, and surface curvature.

3. The system according to claim 1, wherein the image forming element comprises a liquid crystal display.

4. The system according to claim 1, wherein the image forming element comprises digital light processing.

5. The system according to claim 1, wherein the image forming element comprises liquid crystal on silicon.

6. The system according to claim 1, wherein the at least one processor modifies the outgoing image using embedded routines.

7. The system according to claim 1, wherein the detection module repeats the projection and detection of colors and intensities for each projected wavelength component and for at least two brightness levels in order to create a profile.

8. The system according to claim 7, wherein the profile is modified using color correction tables.

9. A method for modifying an image prior to projection comprising the steps of:

projecting a series of colors and intensities from a detection module towards a projection surface, wherein the series of colors have a slight, overlap along the projection surface;

receiving the reflected intensity and color within the detection module for detecting the reflected intensity and color for each section of the projection surface to determine the color and intensity shift;

determining at least one property of the projection surface and creating a profile, the at least one property including texture;

creating an overlay by comparing the profile to a standard profile;

utilizing the overlay to modify an image to be projected; and projecting the modified image from an image forming element to the projection surface.

10. The method according to claim 9, wherein the at least one property is selected from a group further comprising: color and distance from the detection module to the surface, and surface curvature.

11. The method according to claim 9, wherein the step of projecting is performed using a liquid crystal display projector.

12. The method according to claim 9, wherein the step of projecting is performed using a digital light processing projector.

13. The method according to claim 9, wherein the step of: detecting is performed using a wireless device, the wireless device configured to transmit detected information to an image projector.

14. The method according to claim 9, further comprising the step of modifying the overlay to create a user preference overlay indicative of image adjustments preferred by a user.

15. The method according to claim 9, further comprising the step of providing an RFID tag storing at least one of the overlay and the at least one property.

16. The method according to claim 15, wherein the RFID tag is provided in proximity to the projection surface.

17. A video projector comprising:

a detection module comprising a light source projecting a series of colors and intensities towards a projection surface and of detecting the reflected colors and intensities from the projection surface to determine a color and intensity shift, wherein the color and intensity shift is used to determine at least one property of the projection surface, where the at least one property of the projection surface includes texture, wherein the series of colors have a slight, overlap along the projection surface;

at least one processor configured to modify an outgoing image in response to the at least one property of the projection surface;

a video receiving unit connected to the at least one processor and configured to receive the at least one modified outgoing image; and an image forming element configured to allow the modified outgoing image to pass there through and to project the modified outgoing image towards the projection surface.

18. The video projector according to claim 17, the detection module further comprising at least one spectral sensor, the sensor configured to measure color values of the projection surface.

19. The video projector according to claim 17, further comprising embedded routines stored within at least one processor housed within the projector.

20. The video projector according to claim 19, wherein the modified outgoing image is created using embedded routines which include color correction and intensity correction routines.

* * * * *